(12) United States Patent
Fukaya et al.

(10) Patent No.: US 6,378,792 B2
(45) Date of Patent: *Apr. 30, 2002

(54) FUEL INJECTION NOZZLE

(75) Inventors: Kanehiro Fukaya; Masami Hirata; Norio Tsuzuki; Hiroshi Oda; Tsuneaki Aoki, all of Obu (JP)

(73) Assignee: Aisan Kogyo Kabushiki Kaisha, Obu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,843

(22) Filed: Apr. 5, 1999

(30) Foreign Application Priority Data

Apr. 10, 1998 (JP) .......... 10-099300
Apr. 20, 1998 (JP) .......... 10-109423
Apr. 22, 1998 (JP) .......... 10-112293

(51) Int. Cl.$^7$ .............. F02M 61/00
(52) U.S. Cl. .............. 239/533.12; 239/533.2; 239/538.3; 239/533.14
(58) Field of Search .......... 239/533.2, 533.3, 239/533.12, 533.14, 596, DIG. 19

(56) References Cited

U.S. PATENT DOCUMENTS 3,838,821 A * 10/1974 Berlyn ............ 239/533.12
4,857,696 A * 8/1989 Taeusch et al. ...... 219/121.7

FOREIGN PATENT DOCUMENTS

| JP | 354125148 | * | 9/1979 |
| JP | 404350362 | * | 12/1992 |
| JP | 6249105 | | 9/1994 |
| JP | 9066381 | | 3/1997 |
| JP | 409079114 | * | 3/1997 |
| JP | 9126095 | | 5/1997 |

* cited by examiner

*Primary Examiner*—David O. Scherbel
*Assistant Examiner*—Robin O. Evans
(74) *Attorney, Agent, or Firm*—Dennison, Scheiner & Schultz

(57) ABSTRACT

A fuel injection nozzle is provided with a valve seat having a valve opening in which a valve is slidably provided, and a seat portion on which the valve is seated, and a nozzle tip having a sack portion and an injection opening 36a formed on the sack portion. The valve seat is formed of metal, and at the same time, the nozzle tip is molded by metal injection molding, wherein the valve seat and nozzle tip are joined by welding, or after the injection opening of the nozzle tip is formed from the upstream side in the fuel injection direction by laser machining, the valve seat and nozzle tip are joined by welding.

13 Claims, 12 Drawing Sheets

FUEL INJECTION NOZZLE

FIELD OF THE INVENTION

The present invention relates to a fuel injection nozzle for use in a fuel injection valve in an internal combustion engine, etc.

DESCRIPTION OF THE RELATED ART

A known integral type fuel injection nozzle described in Japanese Laid-Open Patent Publications Nos. 9-66381 and 9-126095 is shown in partial front sectional view in FIG. 1. The fuel injection nozzle 10 is molded from steel material and has a valve opening 13 in which a fuel injection valve 12 is slidably provided, a valve seat or seat portion 14, and a rounded or "sack" portion 16, which has a generally semi-spherical inner circumferential surface 16a. An injection opening 17 is formed in the sack portion 16 and fuel is injected into the engine through this injection opening 17. The injection opening 17 is formed in the nozzle 10 by laser machining from the downstream side or the upstream side in the fuel injection direction.

However, if the injection opening 17 is formed from the downstream side using a laser machining process, dross accumulates in the fuel injection nozzle 10, and the measuring accuracy of injection fuel may be diminished. Dross is metal burrs that are formed when the metal melts during the laser machining process and adheres to the nozzle 10.

On the other hand, if the injection opening 17 is formed from the upstream side using a laser machining process, an optical fiber must be connected to a laser beam emitting apparatus and the laser machining process is indirectly performed by inserting the optical fiber into the valve opening 13. In this case, because the laser beam emitted by the optical fiber scatters, a special beam condensing device must be utilized to condense the laser beam. Furthermore, because the valve opening 13 is generally small (approximately 6 mm) in diameter, the machining accuracy of the opening profile is limited.

An electric spark machining process also can form an injection port. However, because the time required to fabricate the injection port using an electric spark machining port is substantially longer than the time required for laser machining, manufacturing efficiency is reduced.

A known two-piece type fuel injection nozzle described in Japanese Laid-Open Patent Publication No. 6-249105 is shown by partial sectional view in FIG. 2. This fuel injection nozzle 20 comprises a valve seat 21 made from steel material and a nozzle tip 25 molded from ceramic. A valve opening 23, in which a fuel injection valve 22 is slidably secured, and a seat portion 24, on which the valve 22 contacts, are formed on the valve seat 21. The nozzle tip 25 includes a sack portion 26 having a generally semi-spherical inner circumferential surface 26a and an injection opening 27. The valve seat 21 and nozzle tip 25 are joined by a brazing material 29 using a brazing process. However, because brazing these two parts is difficult, manufacturing costs are relatively high.

SUMMARY OF THE INVENTION

It is, accordingly, an object of the invention to provide improved fuel injection nozzles that can be manufactured efficiently.

In one aspect of the present teachings, improved manufacturing processes are described that facilitate the joining of the valve seat and the nozzle tip of a fuel injection nozzle.

In another aspect of the present teachings, improved methods for forming an injection opening in the nozzle tip are described.

In a further aspect of the present teachings, improved methods for manufacturing a fuel injection nozzle are described in which an optionally shaped injection opening having excellent measuring accuracy can be easily formed on the nozzle tip in a short time.

Other objects, features and advantages of the present invention will be readily understood after reading the following detailed description together with the accompanying drawings and the claims.

DETAILED DESCRIPTION OF THE INVENTION

Figure 1:
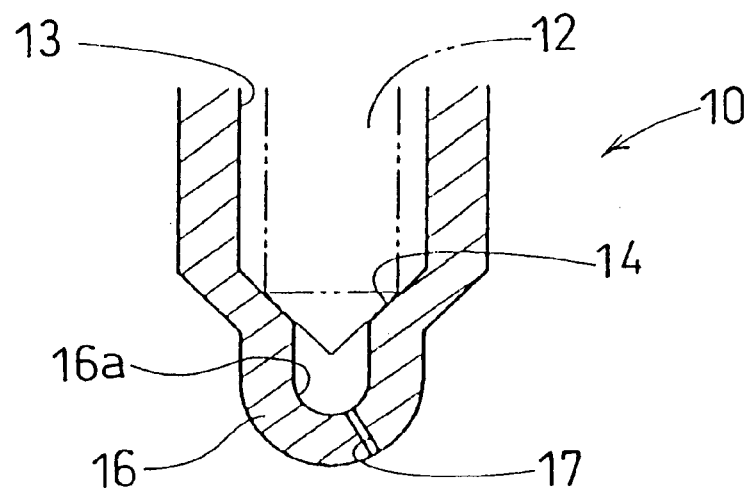
FIG. 1 is a partial front sectional view of a known integral type fuel injection nozzle.
Figure 2:
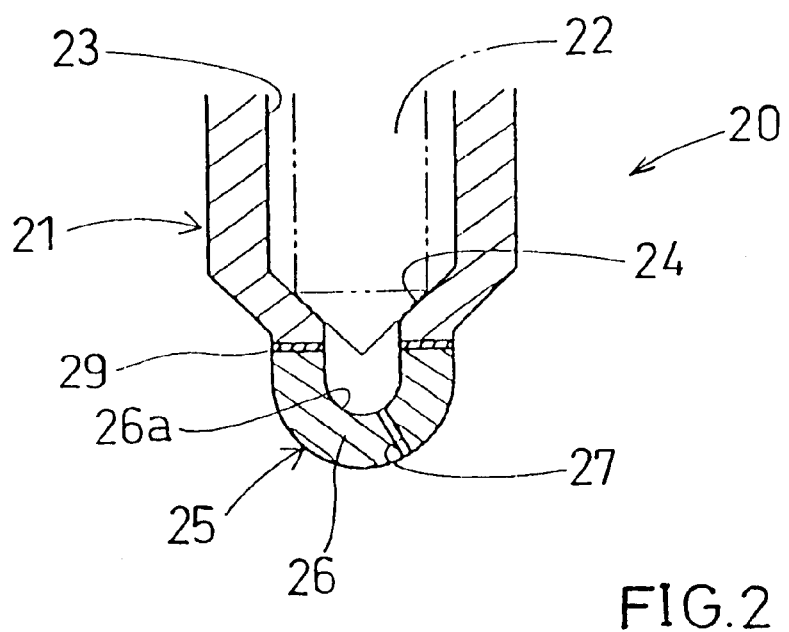
FIG. 2 is a partial front sectional view of a known two-piece type fuel injection nozzle.

In one aspect of the present teachings, a fuel injection nozzle is taught that has a valve needle and a valve seat having a valve opening in which the valve needle slidably contacts and a seat portion on which the valve needle is seated. Preferably, the valve seat is made of metal. The fuel injection nozzle further includes a metal injection molded nozzle tip welded to the valve seat and having a rounded portion with a generally spherical inner surface and an injection opening formed within the rounded portion, In another aspect, a fuel injection nozzle is taught in which the nozzle tip is laser machined. The injection opening of the nozzle tip can be formed either from the inner (upstream) surface or the outer (downstream) surface of the rounded portion.

In either fuel injection nozzle, an engaging member may be provided that consists of a projection portion and a concave portion that can join the surfaces of the valve seat and the nozzle tip. Preferably, the valve seat and the nozzle tip are both made of metal and are joined by welding.

The injection opening is preferably a fan shaped slit having a predetermined angle. In addition, the center of the injection opening angle may be positioned upstream from the center of the generally spherical inner surface of the rounded portion. In addition, Pb may define a length from the center of the generally spherical inner surface of the rounded portion to the center of the opening angle of the injection opening, Rs may define the radius of the generally spherical inner surface of the rounded portion and Pb preferably satisfies the relation:

$$0 \leq Pb \leq 0.75 \ Rs.$$

Method of manufacturing such fuel injection nozzles also are taught. In one method, a metal valve opening and a metal valve seat having a seat portion are formed by metal injection molding. A rounded or sack portion and a nozzle tip having an injection opening are separately formed by metal injection molding. Finally, the valve seat and the nozzle tip are welded together.

Alternatively, a fuel injection nozzle may be manufactured by first metal injection molding a valve opening and a valve seat having a seat portion. A sack portion can then be formed on a metal nozzle tip by a variety of methods, and an injection opening may preferably be formed in the sack portion by laser machining. Finally, the valve seat and the nozzle tip may be welded together.

Each of the additional features and method steps disclosed above and below may be utilized separately or in conjunction with other features and method steps to provide improved fuel injector nozzles and methods for making such nozzles. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative and representative examples of the invention.

FIRST REPRESENTATIVE EXAMPLE

The first representative example of an improved fuel injection nozzle will be described with reference to FIGS. 3 through 6. Such a fuel injection nozzle 30 includes a cylindrical valve seat 31 disposed adjacent to a generally cup-shaped nozzle tip 35.

A needle-like valve 32 is provided inside the valve seat 31 and can slide in the axial direction (the vertical direction in the drawings). A seat portion 34 is formed in the valve seat 31 and the valve 32 contacts the seat portion 34 during the operation of the nozzle 30. The valve seat 31 may formed from a steel bar by a forging process (for example, cold-forging). The steel bar may be, for example, SUS440C (stainless steel). The valve seat 31 also can be machined from a steel bar. The valve seat 31 is preferably hardened in order to improve the wear resistance properties of the seat portion 34.

A rounded or "sack" portion 36, which has a generally semi-spherical inner circumferential surface 36a, and an injection opening 37, which injects fuel from the valve opening 33 into the engine (not shown), are formed in the nozzle tip 35. For an in-cylinder injection type fuel injection valve, the injection opening 37 is slit-shaped with a section that opens in a fan shape at a predetermined angle. The opening angle of the injection opening 37 is preferably between about 30° and 160°.

The sack portion 36 and injection opening 37 of the nozzle tip 35 are preferably simultaneously molded by metal injection molding (known as MIM molding). MIM molding is well known in the art and includes the steps of blending, molding, liquid de-oiling and sintering. In the blending step, minute grains of metal powder are blended with a binder. In the molding step, the blended material is molded by an injection molding machine. In the liquid de-oiling step, the binder is removed from a molded article, using a solvent in a de-oiling hearth. In the sintering step, the de-oiled molded article is sintered in a sintering hearth. If the nozzle tip 35 is molded by metal injection molding, for example, powdered SUS316 (stainless steel) is preferably used as the metal material. By molding the nozzle tip 35 using MIM process, drilling work on the nozzle tip 35 is not longer required in order to form the injection opening 37.

Preferably, the nozzle tip 35 is joined to the valve seat 31. Because both the valve seat 31 and the nozzle tip 35 are preferably made of metal, the valve seat 31 with the nozzle tip 35 may be joined by welding. Specifically, the upper end face 35a of the nozzle tip 35 is positioned to face the lower end face 33a of the valve seat 31, and the valve seat 31 is joined to the nozzle tip 35 by welding 39, for example, laser welding, the circumferential portion of the two facing parts. After the valve seat 31 and the nozzle tip 35 are joined, the fuel injection nozzle 30 preferably is finished by polishing the seat portion 34.

Figure 3:
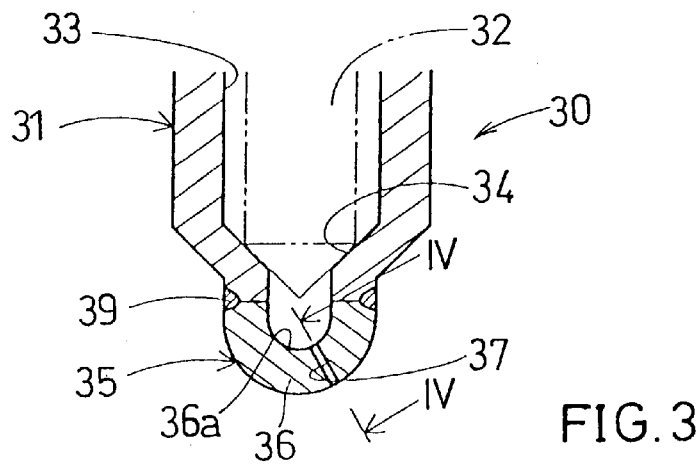
FIG. 3 is a partial front sectional view of a fuel injection nozzle according to a first representative example.
Figure 4:
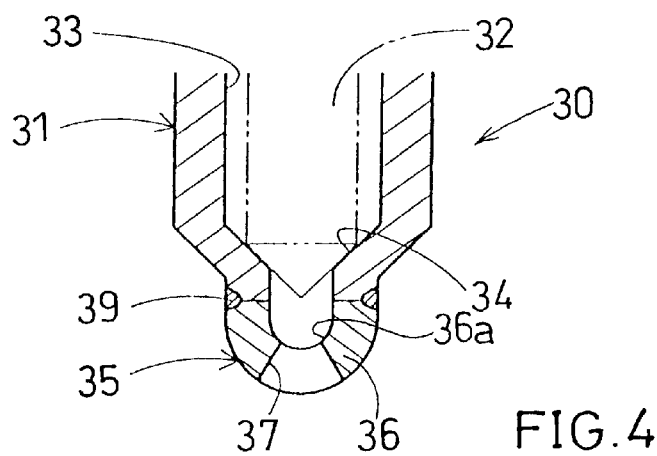
FIG. 4 is a cross-sectional view taken along the line IV—IV in FIG. 3.
Figure 5:
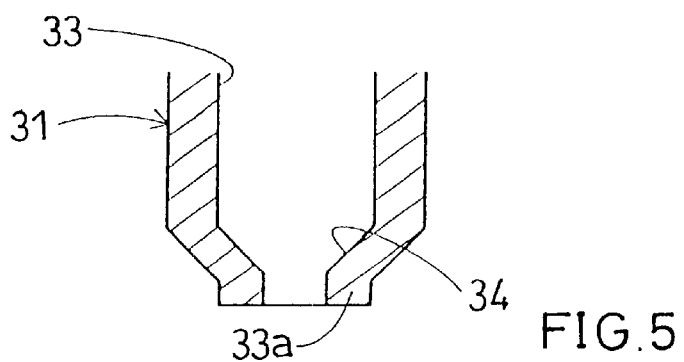
FIG. 5 is a partial front sectional view of a valve seat used in the first representative example.
Figure 6:
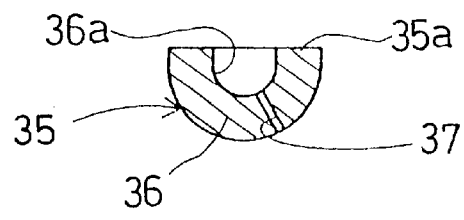
FIG. 6 is a front sectional view of a valve tip used in the first representative example.

In FIGS. 3 through 5, the upper half portion of the valve seat 31 has been omitted, because those skilled in the art will recognize that the upper end part of the valve seat 31 is attached to the body of a fuel injection valve.

As described above, if the valve seat 31 and nozzle tip 35 are made of metal and are join by welding, brazing the valve seat 31 and nozzle tip 35 is no longer required. Furthermore, if the injection opening 37 is formed by molding the nozzle tip 35 using an MIM process, no drilling work on the nozzle tip 35 is required to form the injection opening 37. Therefore, the manufacturing process for a fuel injection nozzle is simplified and the accuracy of the nozzle is substantially improved.

In addition, an integral type fuel injection nozzle, as shown in FIG. 1, can be formed by metal injection molding. But if an integral type fuel injection nozzle is molded by metal injection molding, metal powder must be used. Therefore, it may be difficult to obtain a precise surface roughness of the seat portion, even if polishing is performed on the seat portion after molding. Furthermore, in order to obtain a precise surface roughness, metal powder having a small grain size must be used, thereby increasing manufacturing costs.

On the other hand, in the first representative example, because only the nozzle tip 35 is molded by metal injection molding, only a small amount of metal powder is necessary, and a larger grain size. The valve seat 31 also can be formed by forging or machining. Therefore, even though the valve seat 31 and nozzle tip 35 are joined by welding, a fuel injection nozzle according to the first representative example can be produced at a cheaper cost than that of an integral type fuel injection nozzle that is molded by metal injection molding.

SECOND REPRESENTATIVE EXAMPLE

The second representative example of an improved fuel injection nozzle will be described with reference to FIGS. 7 through 11. The fuel injection nozzle 40 comprises a cylindrical valve seat 41 and a flat plate type nozzle tip 45.

A needle-like valve 42 is provided inside the valve seat 41 and can slide in the axial direction (the vertical direction in the drawings). A seat portion 44 is formed in the valve seat 41 and the valve 42 contacts the seat portion 44 during the operation of the nozzle 40. The valve seat 41 may formed from a steel bar by a forging process (for example, cold-forging). The steel bar may be, for example, SUS440C (stainless steel). The valve seat 41 also can be machined from a steel bar. The valve seat 41 is preferably hardened in order to improve the wear resistance properties of the seat portion 44.

A sack portion 46, which has a generally semi-spherical inner circumferential surface 46a, and a flange portion 45a are formed at the nozzle tip 45. The upper side 45b of the flange portion 45a is formed so as to have substantially the same inner and outer diameters as the diameters of the lower side 41a of the valve seat 41. An injection opening 47 is formed in the sack portion 46 and passes through a wall portion to inject fuel flowing through the valve opening 43. For an in-cylinder injection type fuel injection valve, the injection opening 47 is slit-shaped with a section that opens in a fan shape at a predetermined angle. The opening angle of the injection opening 47 is preferably between about 30° and 160°. The nozzle tip 45 is preferably made of metal and formed in a plate shape.

The nozzle tip 45 is joined to the valve seat 41. As described in the first representative embodiment, if both the valve seat 41 and the nozzle tip 45 are made of metal, the valve seat 41 and nozzle tip 45 can be joined by welding. However, because the circumferential length of the joined portions of the valve seat 41 and the nozzle tip 45 in the second representative example is longer than that of the first representative example, the welding energy must be larger than in the first representative example. After the valve seat 41 and the nozzle tip 45 are joined, a fuel injection nozzle 40 is again finished by polishing the seat portion 44.

Figure 7:
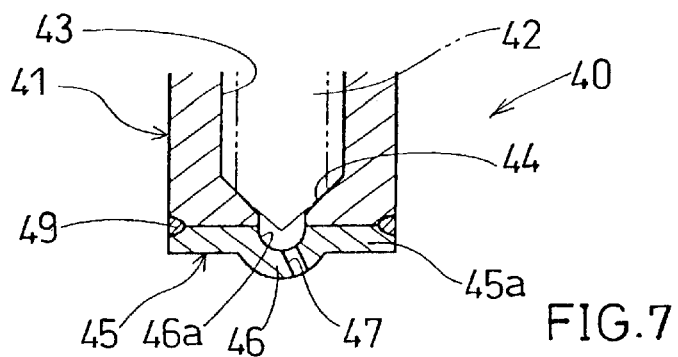
FIG. 7 is a partial front sectional view of a fuel injection valve according to a second representative example.
Figure 8:
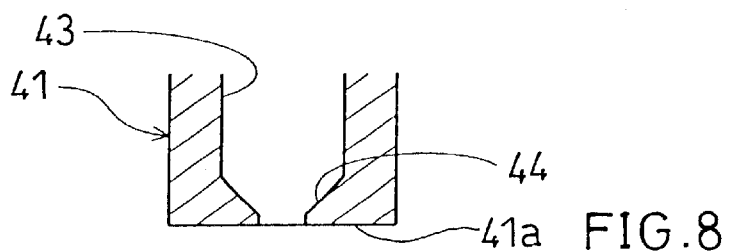
FIG. 8 is a partial front sectional view of a valve seat used in the second representative example.
Figure 9:
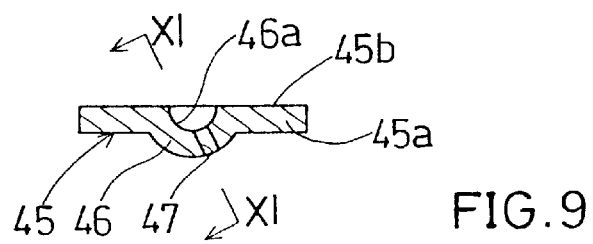
FIG. 9 is a front sectional view of a nozzle tip used in the second representative example.
Figure 10:
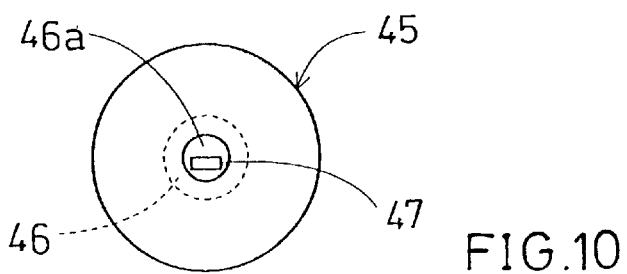
FIG. 10 is a plan view of a nozzle tip used in the second representative example.
Figure 11:
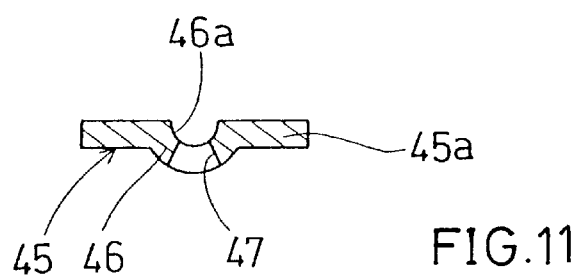
FIG. 11 is a cross-sectional view taken along the line XI—XI in FIG. 9.

As in the first representative example, the upper half portion of the valve seat 41 has been omitted in FIGS. 7 and 8, because a person of skill in the art would recognize that the upper end portion of the valve seat 41 is attached to the body of the fuel injection valve.

Figure 12:
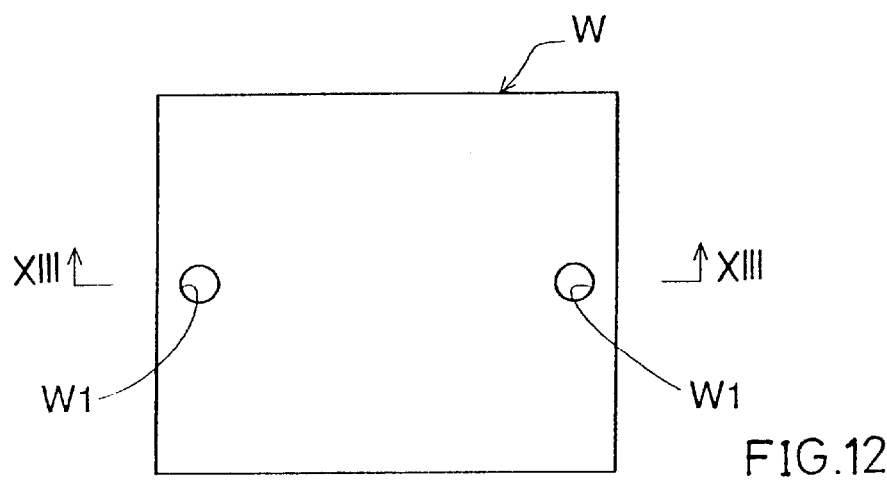
FIG. 12 is view showing a representative nozzle tip manufacturing process.
Figure 13:
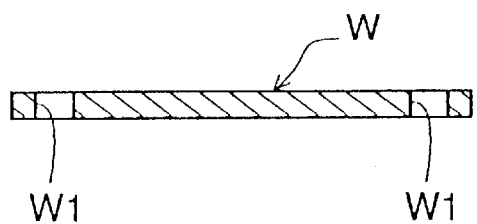
FIG. 13 is a cross-sectional view taken along the line XIII—XIII in FIG. 12.

Preferably, nozzle tip 45 is preferably manufactured according to the following steps shown in FIGS. 12–23. Metal material W formed into a generally flat rectangular shape by forging (for example, cold-forging), for example, a plate-like material of SUS316 (stainless steel), as shown in FIGS. 12 and 13. Positioning holes W1 are formed at both the left and right ends of material W.

Figure 14:
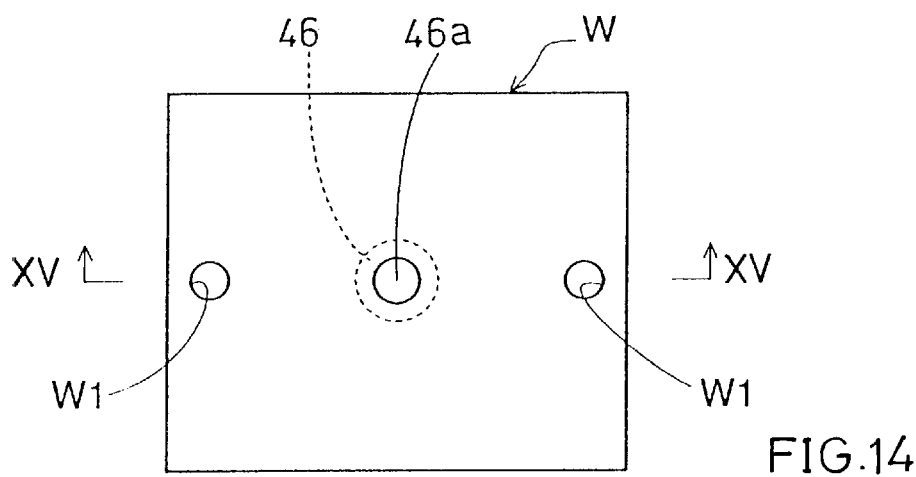
FIG. 14 is a view showing a representative nozzle tip manufacturing process.
Figure 15:
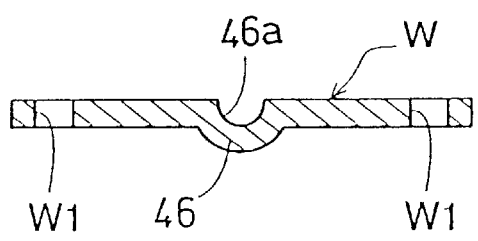
FIG. 15 is a cross-sectional view taken along the line XV—XV in FIG. 14.
Figure 16:
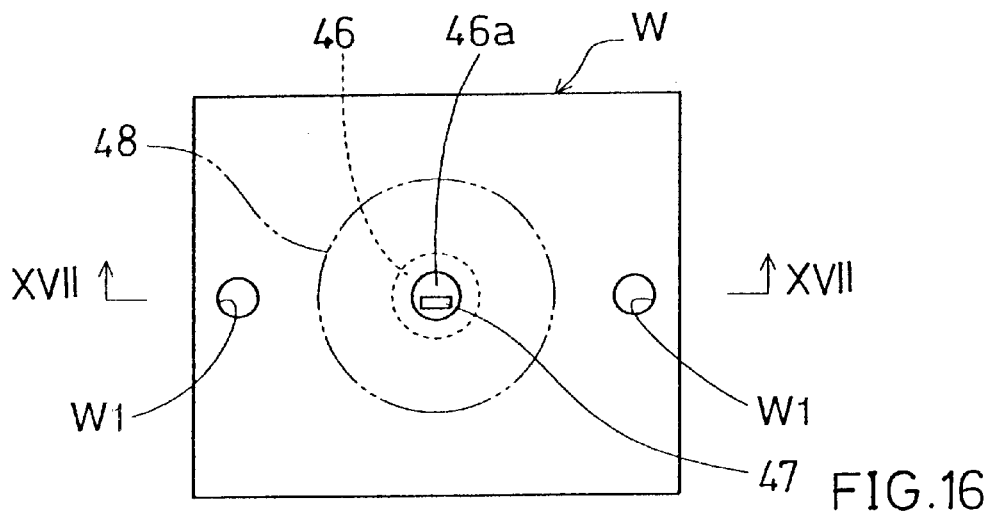
FIG. 16 is a view showing a representative nozzle tip manufacturing process.
Figure 17:
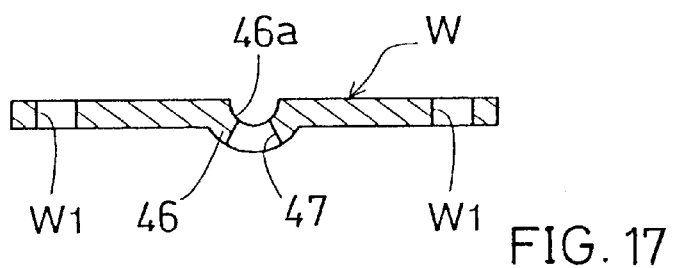
FIG. 17 is a cross-sectional view taken along the line XVII—XVII in FIG. 16.

A sack portion 46 having a generally semi-spherical inner circumferential surface 46a at the central portion of the material W is first formed by forging (for example, cold-forging), as shown in FIGS. 14 and 15. An injection opening 47 is then formed in the sack portion 46 of material W by laser machining, as shown in FIGS. 16 and 17. If dross accumulates inside (i.e., the inner circumferential surface 46a side) the nozzle tip 45, the measurement accuracy of injected fuel may be diminished. Therefore, the laser machining is preferably performed from the upstream side of the injection opening 47 (with respect to the fuel injection direction). In this representative example, because the nozzle tip 45 is a separate from the valve seat 41, the laser machining can be performed while accurately and directly supplying an assisting gas and without the use of an optical fiber or any special light condensing device.

The nozzle tip 45 can be completed by punching out the circular portion (the portion shown with a double-dashed line 48 in FIG. 16), including the sack portion 46, from the material W. According to this method, the injection opening 47 may be formed either before or after punching out the nozzle tip 45 from the material W.

Figure 18:
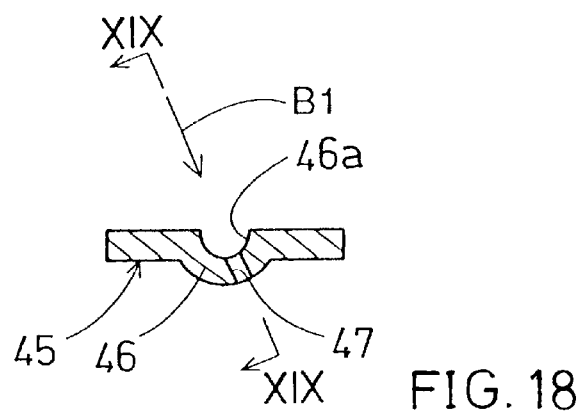
FIG. 18 is a view showing a method for forming an injection opening in the nozzle tip.
Figure 19:
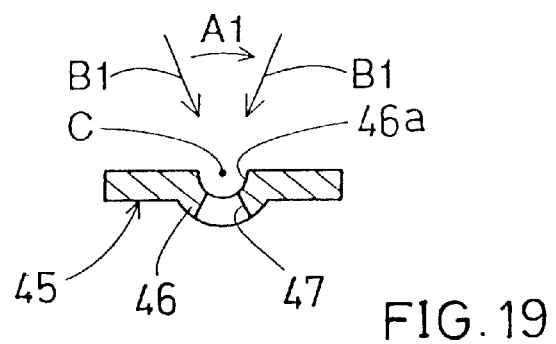
FIG. 19 is a cross-sectional view taken along the line XIX—XIX in FIG. 18.

Preferably, the injection opening 47 is formed by laser machining process shown in FIGS. 18 and 19. Specifically, a laser beam is emitted from a laser beam emitting device and irradiates the inner circumferential surface 46a of the sack portion 46 from the upstream side to form the injection opening 47. A fixture (not shown) preferably fixes the nozzle tip 45 (or the material W) during this step. The optical axis B1 of the laser beam is then turned in the direction of the arrow A1 shown in FIG. 19 to center around the vicinity of the center C of the inner circumferential surface 46a of the sack portion 46. Thus, a slit-like injection opening 47 is formed with fan shaped section having a predetermined angle.

In the fuel injection nozzle according to the second representative example, it is not necessary to use any optical fiber or any special light condensing device, and the injection opening 47 can be formed by laser machining while directly and accurately supplying an assisting gas from the upstream side of the injection opening 47. Further, a laser beam can be directed onto the surface of a nozzle tip at any desired position and at any desired angle. Therefore, the injection opening 47 can be quickly manufactured with improved measurement accuracy at any profile. As was the case with the first representative example, because both the valve seat 41 and the nozzle tip 45 are made of metal, the valve seat 41 and the nozzle tip 45 can be joined by welding 49, thereby eliminating the need for a brazing step. Consequently, the ease of manufacturing accurate fuel injection nozzles can be further improved.

In the above-describe method, although an injection opening 47 was formed by irradiating only one side of the injection opening 47, the injection opening 47 can be formed by irradiating both sides of the injection opening 47.

Figure 20:
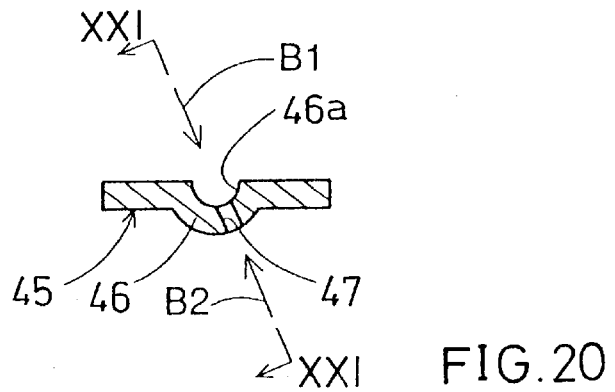
FIG. 20 is a view showing a method for forming an injection opening in the nozzle tip.
Figure 21:
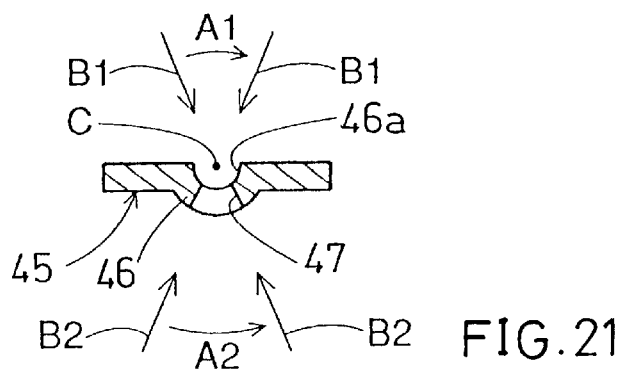
FIG. 21 is a cross-sectional view taken along the line XXI—XXI in FIG. 20.

For example, the injection opening 47 can be formed by the alternative method shown in FIGS. 20 and 21. That is, the upstream side of injection opening is irradiated by a first laser beam toward the inner circumferential surface 46a of the sack portion 46. At the same time, the downstream side of the injection opening 47 is irradiated by a second laser beam toward the outer circumferential side of the sack portion 46. The optical axes B1 and B2 of both laser beams are then turned in the directions of the arrows A1 and A2 shown in FIG. 21 centering around the vicinity of the center C of the inner circumferential surface 46a of the sack portion 46. In this case, the dimensional accuracy at the downstream side of the injection opening 47 can be improved.

Alternatively, the upstream side of the injection opening 47 can be irradiated before the downstream side of the injection opening 47 to form the injection opening 47. In this case, substantially no spatters and dross will adhere to the inside of the nozzle tip 45. Thus, the dimensional accuracy of both the upstream and downstream sides of the injection opening 47 can be improved.

Figure 22:
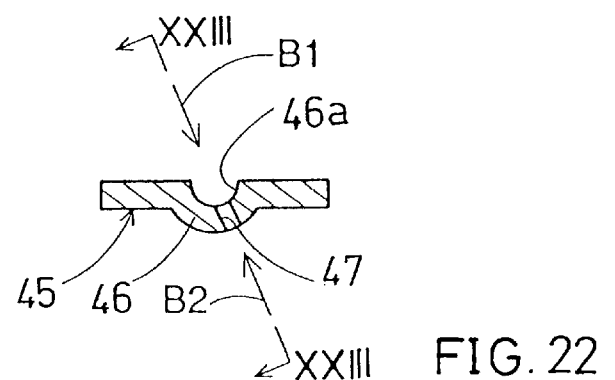
FIG. 22 is a view showing a method for forming an injection opening in the nozzle tip.
Figure 23:
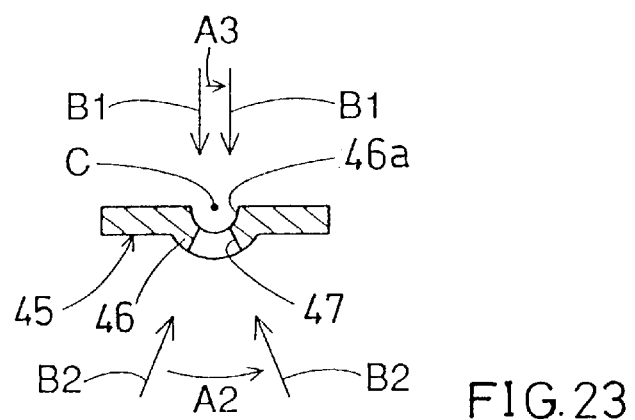
FIG. 23 is a cross-sectional view taken along the line XXIII—XXIII in FIG. 22.

In addition, an injection opening 47 can be formed by the method shown in FIGS. 22 and 23. In particular, the upstream side of the injection opening 47 is irradiated by a laser beam toward the inner circumferential surface 46a of the sack portion 46. The laser beam then irradiates the downstream side of the injection opening 47 toward the outer circumferential surface of the sack portion 46. Preferably, the optical axis B1 of the upstream side laser beam is moved in the direction of arrow A3 shown in FIG. 23, i.e., is moved in parallel to the width direction of the slit. At the same time, the optical axis B2 of the downstream laser beam is turned in the direction of arrow A2, is centered around the vicinity of the center C of the inner circumferential surface 46a of the sack portion 46. If this method is used, after the laser beam irradiates the upstream side of the injection opening 47, the laser beam irradiates the downstream side of the injection opening 47. As a result, the injection opening 47 can be formed using a single laser beam.

THIRD REPRESENTATIVE EXAMPLE

The third representative example of an improved fuel injection nozzle will be described with reference to FIG. 24. In this representative example only the portions that have been changed from the first and second representative examples will be described.

Figure 24:
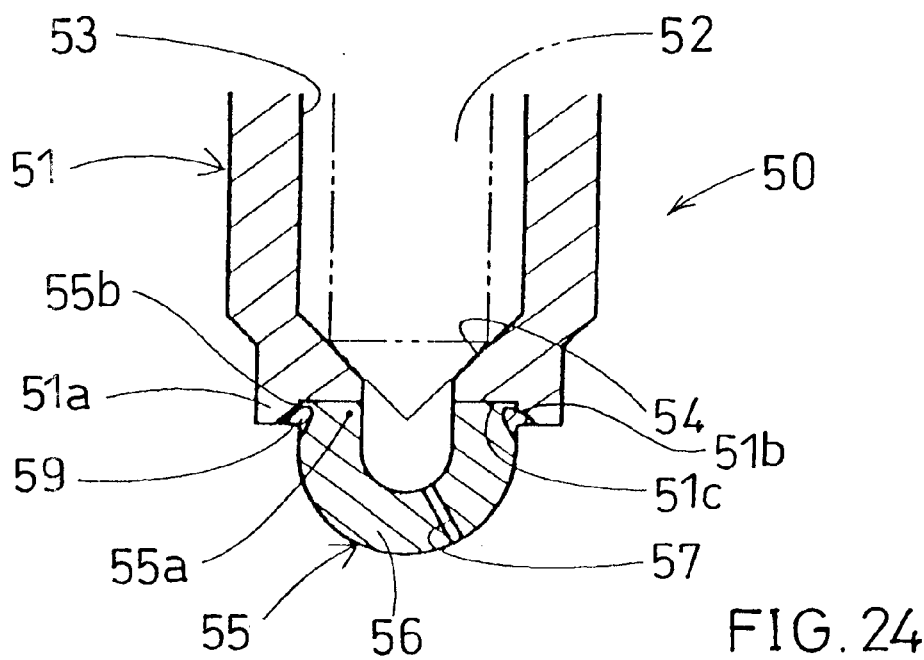
FIG. 24 is a partial front sectional view of a fuel injection nozzle according to a third representative example.

As shown in FIG. 24, a generally cylindrical projection portion 51a is formed on the outer circumferential side of the lower end of the valve seat 51, thereby forming a stepped surface 51c along the inner circumferential side of the lower end of the valve seat 51. The inner circumferential surface 51b of the projection portion 51a has a cylindrical surface and is slidably connected to the outer circumferential surface of the nozzle tip 55. A concave portion, which can be joined to the upper end 55a of the nozzle tip 55, is formed by the interface of the inner circumferential surface 51b and stepped surface 51c of the projection portion 51a. In this representative example, an engaging member consisting of a projection portion and a concave portion, which can engaged with each other, comprises the upper end portion 55a of the nozzle tip 55 and a concave portion of the valve seat that can be engaged with the upper end portion 55a of the nozzle tip 55.

If the valve seat 51 and nozzle tip 55 are joined, the concave portion of the valve seat 51 is joined to the upper end portion 55a of the nozzle tip 55. The inner circumferential portion at the lower end of the projection portion 51a of the valve seat 51 can be joined to the outer circumferential surface of the nozzle tip 55, for example, by laser welding 59. Consequently, if the concave portion of the valve seat 51 and projection portion 55a of the nozzle tip 55 are joined, the valve seat 51 and nozzle tip 55 can be co-axially joined.

FOURTH REPRESENTATIVE EXAMPLE

Figure 25:
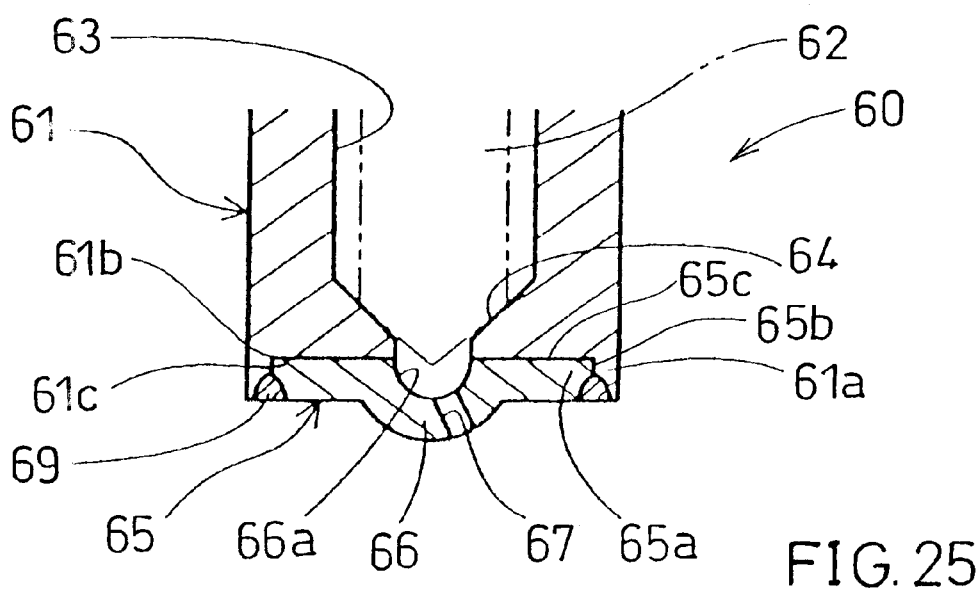
FIG. 25 is a partial front sectional view of a fuel injection nozzle according to a fourth representative example.

The fourth representative example of an improved fuel injection nozzle will be described with reference to FIG. 25. In this example, a generally cylindrical projection portion 61a is formed along the outer circumferential side at the lower end of the valve seat 61, thereby forming a stepped surface 61c at the inner circumferential side of the lower end of the valve seat 61. The inner circumferential surface 61b of the projection portion 61a is formed along a cylindrical surface that is slidably connected to the outer circumferential surface of the flange portion 65a of the nozzle tip 65. A concave portion, which can be engaged with the flange portion 65a of the nozzle tip 55 is formed by the interface of the inner circumferential surface 61b and stepped surface 61c of the projection portion 61a. In this representative example, an engaging member consisting of a projection portion and a concave portion, which can be joined together, comprises the flange portion 65a of the nozzle tip 65 and the concave portion of the valve seat 61 that can be engaged with the flange portion 65a of the nozzle tip 65.

If the valve seat 65 and nozzle tip 65 are joined, the concave portion of the valve seat 61 is engaged to the flange portion 65a of the nozzle tip 65. The inner circumferential portion of the lower end of the projection portion 61a of the valve seat 61 and the outer circumferential surface of the flange portion 65a of the nozzle tip 65 can be joined, for example, by laser welding 69. As was the case with the third representative example, if the concave portion of the valve seat 61 and flange portion 65a of the nozzle tip 65 are joined, the valve seat 61 and nozzle tip 65 can be co-axially joined.

FIFTH REPRESENTATIVE EXAMPLE

Figure 26:
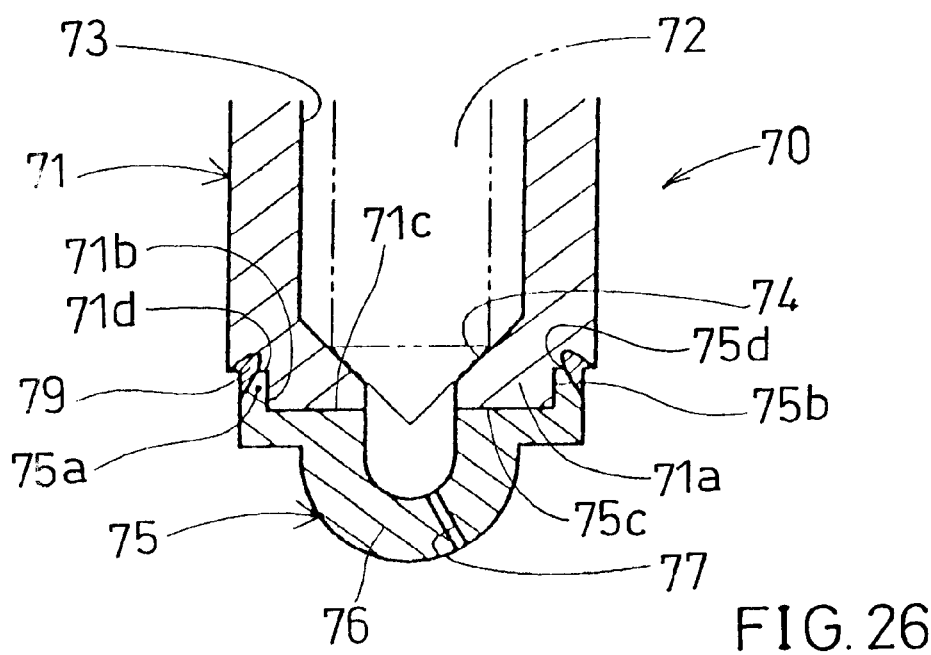
FIG. 26 is a partial front sectional view of a fuel injection nozzle according to a fifth representative example.

The fifth representative example of an improved fuel injection nozzle will be described with reference to FIG. 26. In this example, a generally cylindrical projection portion 71a is formed along the inner circumferential side of the lower end of the valve seat 71, thereby forming a stepped surface 71d along the outer circumferential side of the lower end of the valve seat 71. Further, a generally cylindrical projection portion 75a is formed along the outer circumferential side of the upper end of the nozzle tip 75. Thus, a stepped surface 75c is formed along the inner circumferential side of the upper end of the nozzle tip 75. The inner circumferential surface 75b of the projection portion 75a is formed of a cylindrical surface that is slidably connected to the outer circumferential surface 71b of the projection portion 71a of the valve seat 71. A concave portion that can be engaged with the projection portion 75a of the nozzle tip 75 is formed by the interface of the outer circumferential surface 71b and the stepped surface 71c of the projection portion 71a. In this representative example, an engaging member consisting of a projection portion and a concave portion that can be engaged with each other, comprises the projection portion 75a of the nozzle tip 75 and a concave portion of the valve seat 71 that can be engaged with the projection portion 75a of the nozzle tip 75.

If the valve seat 71 and the nozzle tip 75 are joined, the concave portion of the valve seat 71 and the projection portion 75a of the nozzle tip 75 are engaged with each other. Then, the upper end portion of the projection portion 75a of the nozzle tip 75 and the outer circumferential portion of the stepped portion 71d of the valve seat 71 can be joined by laser welding 79 or a similar operation.

In the fuel injection nozzle 70 according to the fifth representative example, because the concave portion of the valve seat 71 and the projection portion 75a of the nozzle tip 75 are joined with both engaged with each other, it is possible to easily secure the coaxiality of the valve seat 61 and the nozzle tip 65 when they are joined.

SIXTH REPRESENTATIVE EXAMPLE

Figure 27:
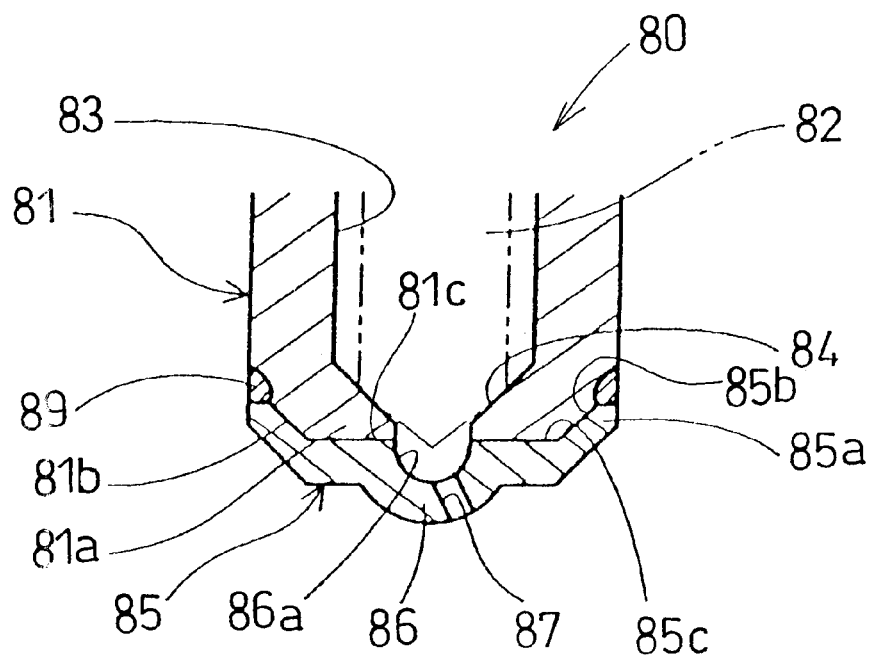
FIG. 27 is a partial front sectional view of a fuel injection nozzle according to a sixth representative example.

The sixth representative example of an improved fuel injection nozzle will be described with reference to FIG. 27. In this example, a tapered surface 81b is formed along the outer circumferential side of the lower end of the valve seat 81, thereby forming a projection portion 81a along the lower end portion of the valve seat 81. Further, a generally conically inverse cylindrical projection portion 85a is formed along the outer circumferential side of the upper end of the nozzle tip 85, thereby forming a stepped surface 85c along the inner circumferential side of the upper end of the nozzle tip 85. The inner circumferential surface 85b of the projection portion 85a is formed into a tapered surface that is brought into facial contact with the tapered surface 81b of the valve seat 81. A concave portion that can be engaged with the projection portion 81a of the valve seat 81 is formed by the interface of the inner circumferential surface 85b and stepped surface 85c of the projection portion 85a. In this representative example, an engaging member consisting of a projection and a concave portion that can be engaged with each other comprises the projection portion 81a of the valve seat 81 and the concave portion of the nozzle tip 85 that can be engaged with the projection 81a of the valve seat 81.

This embodiment can be joined in the same manner as the previous examples to yield the same advantages.

SEVENTH REPRESENTATIVE EXAMPLE

In the fuel injection nozzle used with an in-cylinder injection type fuel injection valve that directly injects fuel into a cylinder of an internal combustion engine, the injection opening has been formed so that fuel is injected in a cylinder substantially in the form of a fan (also known as fan-like injection). For example, a slit-like injection opening having a fan shape with a predetermined angle is formed in the sack portion having a semi-spherical inner circumferential surface. In a known fuel injection nozzle, because the relationship between the center of the semi-spherical inner circumferential surface of the sack portion and the center of the opening angle of the injection opening is not specified, the injection angle of fan-like injection was not stable. Therefore, an object of this representative example is to stabilize the injection angle of fan-like injection.

Figure 28:
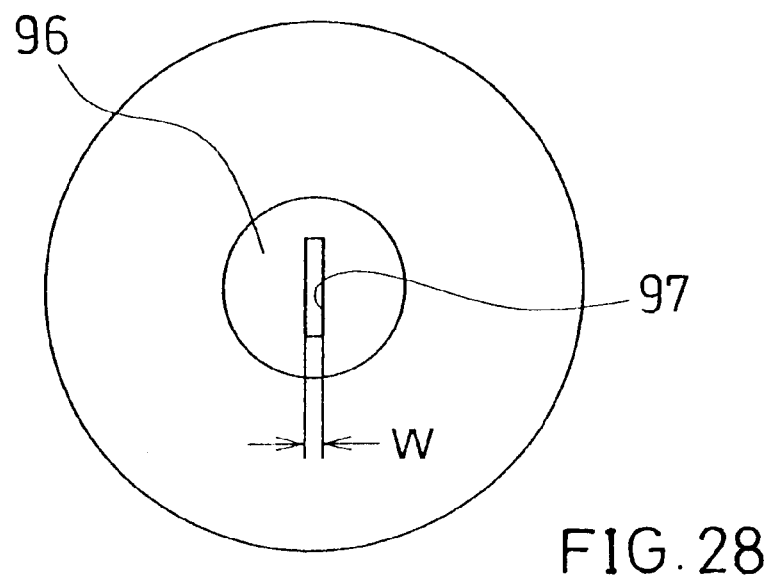
FIG. 28 is a front elevational view of a fuel injection nozzle according to a seventh representative example.
Figure 29:
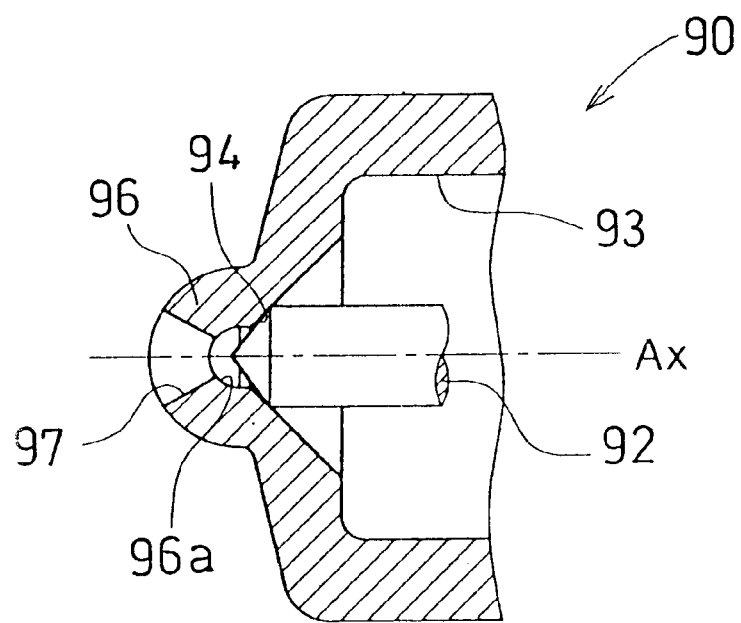
FIG. 29 is a partial front sectional view of a fuel injection nozzle according to the seventh representative example.

Thus, a seventh representative example of an improved fuel injection nozzle will be described with reference to FIGS. 28 through 30. A fuel injection nozzle 90 according to this representative example comprises a valve opening 93 in which a generally needle-like valve 92 of the fuel injection valve is slidably provided in the axial direction (the horizontal direction in FIGS. 29 and 30), a seat portion 94 on which the valve 92 is seated, and a sack portion 96 attached to the downstream side of the seat portion 94. A slit-like injection opening 97 that passes through the inner circumferential surface 96a and the wall portion of the sack portion 94 is formed in the sack portion 94.

The fuel injection pressure is, for example, 120 kg/cm$^2$ and the fuel injection nozzle 90 may be formed as an integral type fuel injection nozzle or may be formed as a two-piece fuel injection nozzle. If a two-piece fuel injection nozzle design is utilized as described in the above-mentioned embodiments, a fuel injection nozzle can be constructed with both the features of this representative example and features of the above-mentioned representative examples.

Figure 30:
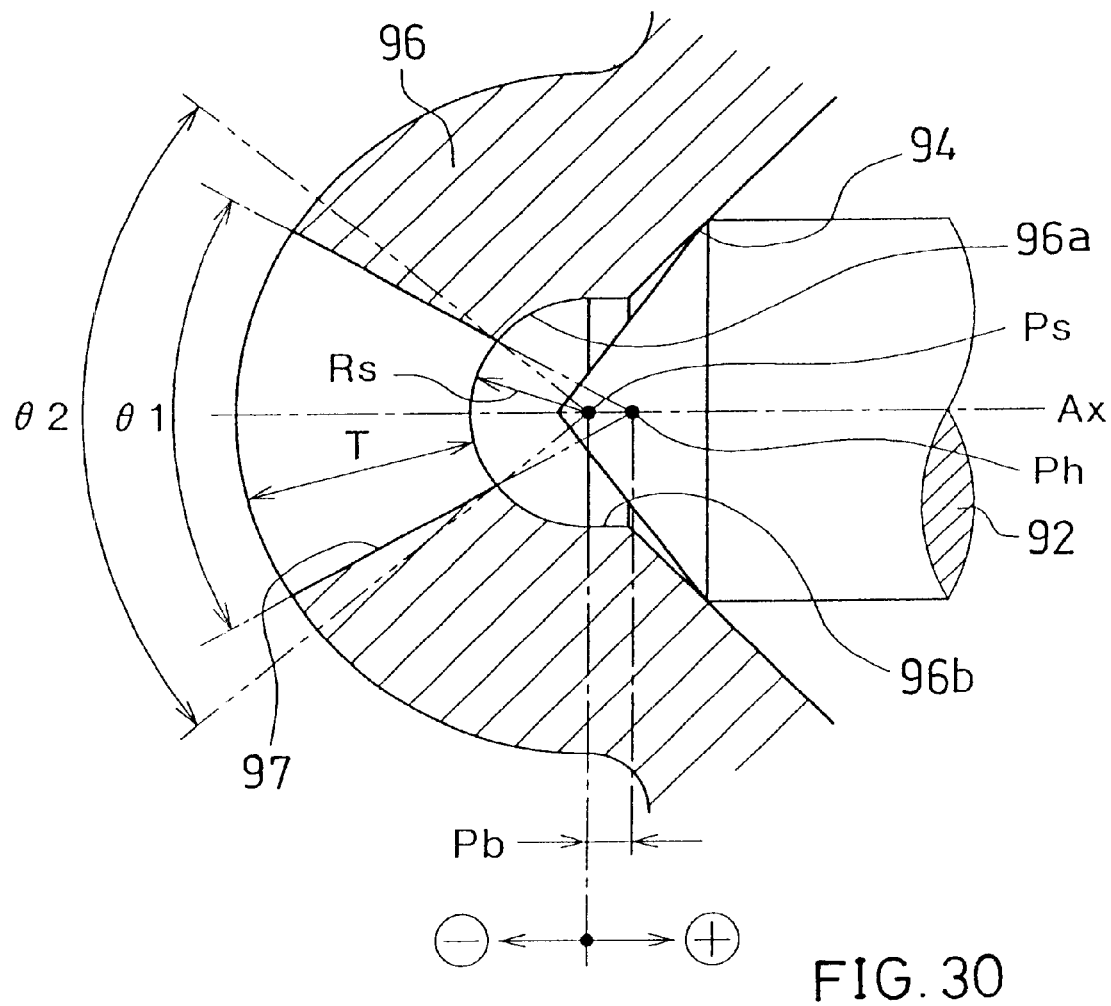
FIG. 30 is a front sectional view showing significant aspects of the fuel injection nozzle according to the seventh representative example.

As shown in FIG. 30, the inner circumferential surface 96a of the sack portion 96 has a semi-spherical inner circumferential surface 96a with a center Ps and a radius Rs. The radius Rs of the semi-spherical inner circumferential surface 96a is, for example, about 0.4 mm. Furthermore, the thickness T of the wall portion of the sack portion 96 is, for example, between about 0.2 and 1.2 mm. The semi-spherical inner circumferential surface 96a of the sack portion 96 is connected to the seat portion 94 via a cylindrical inner circumferential surface 96b of a predetermined length, the radius of which is Rs.

The injection opening 97 opens in a fan shape with a predetermined angle $\theta 1$, as shown in FIG. 30. The opening angle $\theta 1$ of the injection opening 97 is, for example, between about 30° through 160°. The injection opening 97 preferably has a center that is symmetrical around the axis line Ax of the fuel injection nozzle 90. Furthermore, the width W of the injection opening 97 shown in FIG. 28 is, for example, about 0.2 mm.

In this representative example, the center Ph of the opening angle of the injection opening 97 is positioned at a further upstream side in the fuel injection direction than the center Ps of the semi-spherical inner circumferential surface 96a of the sack portion 96. Furthermore, the distance Pb from the center Ps of the semi-spherical inner circumferential surface 96a of the sack portion 96 to the center Ph of the opening angle of the injection opening 97 is set according to the following relation:

$$0 \leq Pb \leq 0.75 \ Rs.$$

In this example, because the radius Rs of the semi-spherical inner circumferential surface 96a is preferably 0.4 mm, the dimension Pb is set according to the following relation:

$$0 \leq Pb \leq 0.3 \ mm.$$

These two relations have been determined based on the following analysis. The graph shown in FIG. 31 characterizes the measurement of the spread angle of the fan-like injection opening with respect to the opening angle $\theta 1$ of the injection opening 97. Specifically, the ratio (θ2/θ1) of the injection (spraying) angle θ2 was measured while sliding the center Ph of the opening angle of the injection opening 97 step by step along the axial line Ax of the fuel injection nozzle 90.

Figure 31:
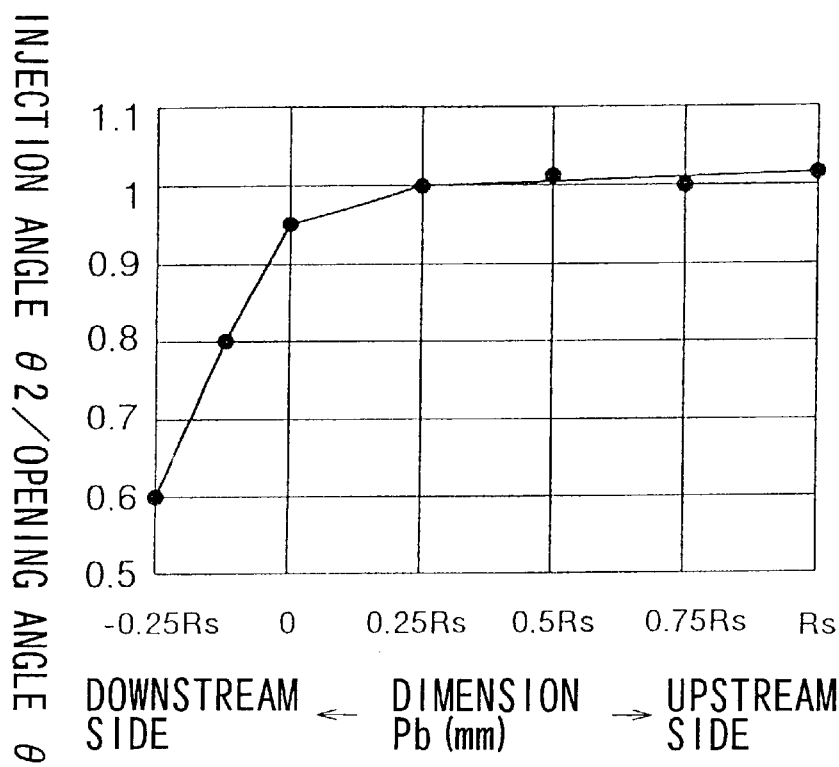
FIG. 31 is a characteristic view showing a relationship between the dimension Pb and the angle ratio θ2/θ1.

In FIG. 30, the injection (spraying) angle θ2 is shown in terms of a hypothetical broadly spread angle. In FIG. 31, the abscissa indicates the dimension Pb (which is shown by a ratio of the semi-spherical inner circumferential surface 96a to the radius Rs), and the ordinate indicates the angle ratio (θ2/θ1). The distance Pb is zero when the center Ph of the opening angle of the injection opening 97 is at the same position as the center Ps of the semi-spherical inner circumferential surface 96a. Further, the distance Pb is assigned a negative value when it deviates in the downstream side from the center Ps of the semi-spherical inner circumferential surface 96a and is assigned a positive value when it deviates in the upstream side from the center Ps of the semi-spherical inner circumferential surface 96a.

According to the characteristic diagram of FIG. 31, if the dimension Pb is less than zero, the angle ratio (θ2/θ1) becomes remarkably small. Therefore, the opening angle θ1 does not correspond to the injection angle θ2. On the other hand, if the dimension Pb is zero or greater, the angle ratio (θ2/θ1) becomes approximately 1. Therefore, the opening angle θ1 substantially corresponds to the injection angle θ2.

By positioning the center Ph of the opening angle of the injection opening 97 at a further upstream side than the center Ps of the semi-spherical inner circumferential surface 96a, a fan-like injection of an injection angle θ2 that is almost equal to the opening angle θ1 of the injection opening 97 can be obtained. Thus, it is possible to stabilize the injection angle θ2 of the fan-like injection.

Figure 32:
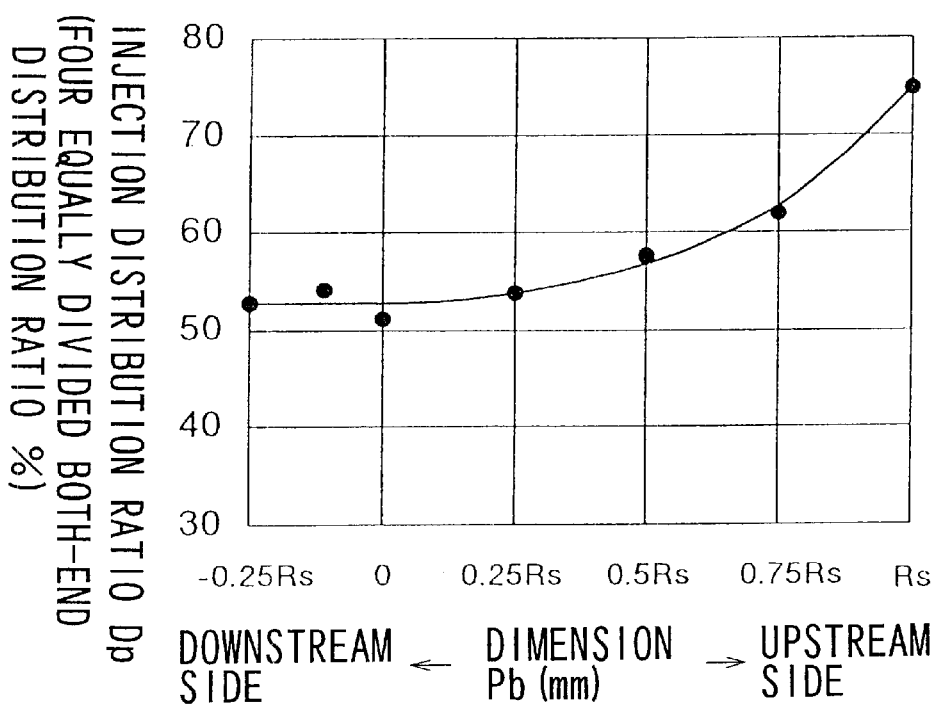
FIG. 32 is a characteristic view showing a relationship between the dimension Pb and the injection distribution ratio Dp.
Figure 33:
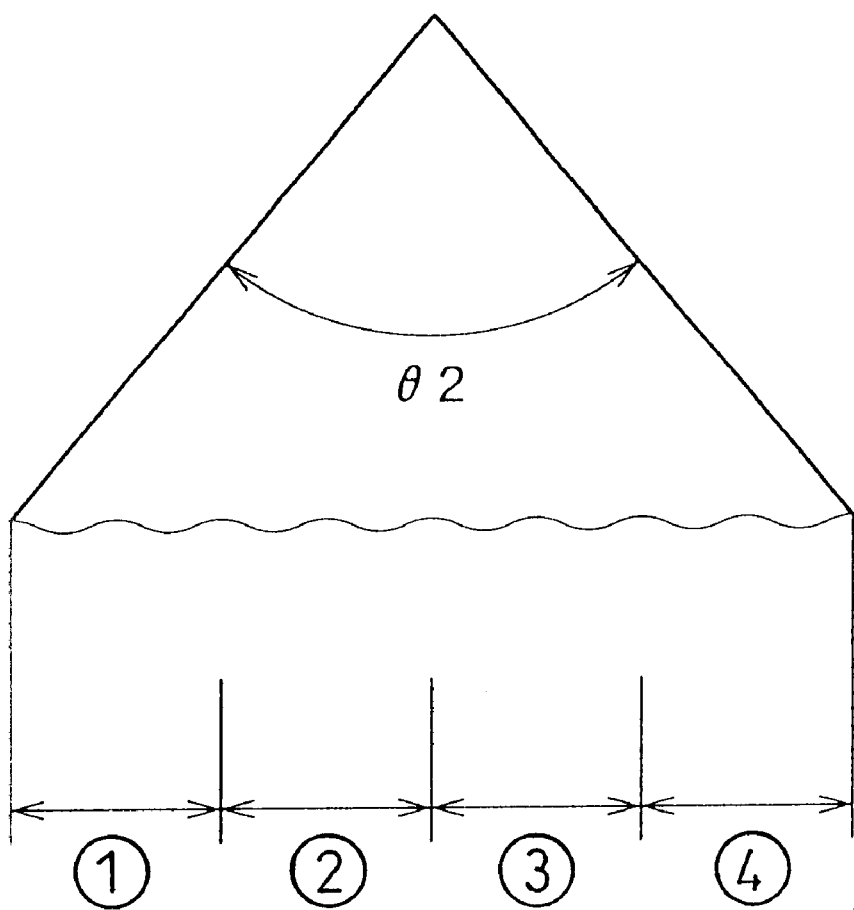
FIG. 33 is a view showing a method of measuring the injection distribution ratio Dp.

Furthermore, the characteristic diagram shown in FIG. 32 was obtained by measuring the injection distribution ratio of a fan-like injection while sliding the center Ph of the opening angle of the injection opening 97 step by step along the axial line Ax of the fuel injection nozzle 1. In FIG. 32, the abscissa shows the dimension Pb as in FIG. 31, and the ordinate shows the injection distribution ratio Dp(%). Further, the injection distribution ratio Dp was measured using four equally divided both-end distribution ratios. As shown in FIG. 33, the spread width of the injection distribution of the injection angle θ2 was divided into four equal parts (1), (2), (3) and (4). If the quantity of fuel distributed in the respective parts (1), (2), (3) and (4) are D1, D2, D3 and D4, the injection distribution ratio Dp is calculated using the following expression:

$$Dp=\{(D1+D4)/(D1+D2+D3+D4)\}\times 100.$$

According to the graph of FIG. 32, because the injection distribution ratio Dp is remarkably increased if the dimension Pb is 0.75 Rs or greater, the injection distribution does not become uniform. On the other hand, because the injection distribution ratio Dp is approximately 50 through 60%, if the dimension Pb is 0.75 Rs or less, the injection distribution is uniform. Therefore, by positioning the center Ph of the opening angle of the injection opening 97 further upstream than the center Ps of the semi-spherical inner circumferential surface 96a, e.g. at a position in which Pb≦0.75 Rs, it is possible to make the injection distribution of the fan-like injection uniform.

Therefore, by setting the distance Pb according to the relation:

$$0\leq Pb\leq 0.75\ Rs.$$

the injection angle θ2 of the fan-like injection can be stabilized, and at the same the injection distribution of the fan-like injection can be made uniform.

These examples can be modified in a variety of ways without departing from the spirit of the invention. For example, the profile of the injection opening is not limited to a slit, and it may be changed to circular, elliptical, polygonal or like profiles in compliance with the injection characteristics of the fuel. In addition, the number of injection openings and positions in which the opening are formed can be variously changed in compliance with the injection characteristics of the fuel. Further, the profile, number, and forming positions of the projection portions and concave portions of the engaging member may be variously changed in a range in which the coaxiality between the valve seat and the nozzle tip can be maintained. Although the above description has been given of a fuel injection nozzle used in a fuel injection valve that supplies fuel to an internal combustion engine, the fuel injection nozzle according to the invention may naturally be used with fluids other than fuel.

What is claimed is:

1. A fuel injection nozzle comprising:
a valve needle;
a valve seat having a valve opening in which the valve needle slidably contacts and a seat portion on which the valve needle is seated; and
a nozzle tip joined to the valve seat and having a rounded portion with a generally spherical inner surface and an injection opening formed within the rounded portion;
wherein the injection opening is a fan shaped slit having a predetermined angle, and the center of the injection opening angle is positioned upstream from the center of said generally spherical inner surface of the rounded portion, and,
wherein Pb defines a length from the center of the generally spherical inner surface of the rounded portion to the center of the opening angle of the injection opening, Rs defines the radius of the generally spherical inner surface of the rounded portion and Pb satisfies the relation:

$$0\leq Pb\leq 0.75\ Rs.$$

2. A fuel injection nozzle as set forth in claim 1, wherein the valve seat and the nozzle tip are both made of metal and are joined by welding.

3. A fuel injection nozzle as set forth in claim 1, wherein an engaging member comprising a projection portion and a concave portion that can be engaged together are disposed between joining surfaces of the valve seat and the nozzle tip.

4. A fuel injection nozzle as set forth in claim 1, wherein the injection opening of the nozzle tip is formed by laser machining.

5. A fuel injection nozzle as set forth in claim 4, wherein the injection opening of the nozzle tip is formed from an inner surface of the rounded portion.

6. A fuel injection nozzle as set forth in claim 4, wherein the injection opening of the nozzle tip is formed from an outer surface of the rounded portion.

7. A fuel injection nozzle as set forth in claim 4, wherein the valve seat and the nozzle tip are both made of metal and are joined by welding.

8. A fuel injection nozzle as set forth in claim 4, wherein an engaging member comprising a projection portion and a concave portion that can be engaged together are disposed between joining surfaces of the valve seat and the nozzle tip.

9. A fuel injection nozzle as set forth in claim 4, wherein Pb defines a length from the center of the generally spherical inner surface of the rounded portion to the center of the opening angle of the injection opening, Rs defines the radius of the generally spherical inner surface of the rounded portion and Pb satisfies the relation:

$$0 \leq Pb \leq 0.75 \text{ Rs}.$$

10. A fuel injection apparatus comprising:
a nozzle having a valve seat portion with a valve opening,
a valve needle slidably disposed within the nozzle and adapted to seal the nozzle when the valve needle contacts the valve seat portion,
a generally rounded nozzle tip coupled to the nozzle and disposed downstream of the valve needle, the nozzle tip having a generally spherical inner surface with a fan-like injection port that opens at an angle of between about 30–160°, wherein:
the angle of the fan-like injection port has a vertex Ph,
a center Ps is defined by the generally spherical inner surface,
a radius Rs is defined between the center Ps and the generally spherical inner surface,
the vertex Ph is disposed upstream of the center Ps and the distance between the vertex Ph and the center Ps is less than 0.75 Rs.

11. A fuel injection apparatus as in claim 10, wherein the nozzle and the nozzle tip are both made of metal and are coupled by a weld.

12. A fuel injection apparatus as in claim 10, wherein the nozzle and the nozzle tip are coupled together via a projecting portion and a concave portion.

13. A fuel injection apparatus as in claim 12, wherein the nozzle and the nozzle tip are both made of metal and are coupled by a weld.

* * * * *

UNITED STATES PATENT AND TRADEMARK OFFICE
CERTIFICATE OF CORRECTION

PATENT NO.   : 6,378,792 B1
DATED        : April 30, 2002
INVENTOR(S)  : Kanehiro Fukaya et al.

It is certified that error appears in the above-identified patent and that said Letters Patent is hereby corrected as shown below:

<u>Title page,</u>
Item [73], Assignees should appear as follows:
--      [73] Assignee:   Aisan Kogyo Kabushiki Kaisha, Obu, Japan; and
                         Toyota Jidosha Kabushiki Kaisha, Toyota, Japan --

Signed and Sealed this

Twentieth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,378,792 B2
DATED          : April 30, 2002
INVENTOR(S)    : Kanehiro Fukaya It is certified that error appears in the above-identified patent and that said Letters Patent is hereby corrected as shown below:

<u>Title page,</u>
Item [75], Inventors, add the following:
-- Minoru Ogawa;
   Soya Takagi;
   Tomojiro Sugimoto;
   Susumu Sukeda; all of Toyota (JP) --

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,378,792 B2
DATED         : April 30, 2002
INVENTOR(S)   : Kanehiro Fukaya It is certified that error appears in the above-identified patent and that said Letters Patent is hereby corrected as shown below:

<u>Title page,</u>
Item [75], Inventors, add the following:
-- Minoru Ogawa;
  Soya Takagi;
  Keiso Takeda;
  Tomojiro Sugimoto;
  Susumu Sukeda; all of Toyota (JP) --

This certificate supersedes Certificate of Correction issued August 19, 2003.

Signed and Sealed this

Eighteenth Day of November, 2003

JAMES E. ROGAN
*Director of the United States Patent and Trademark Office*